March 20, 1962 — H. C. BENGERT — 3,025,901
TIRE CHAIN
Filed May 25, 1960 — 2 Sheets-Sheet 1
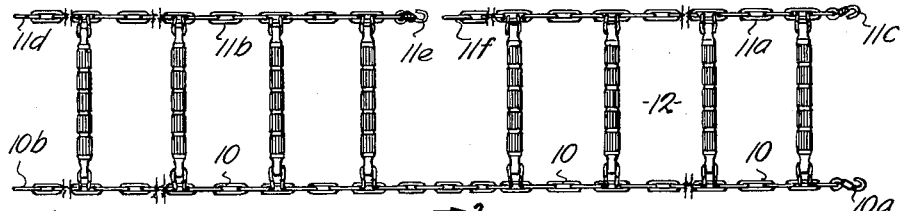
Fig. 1.
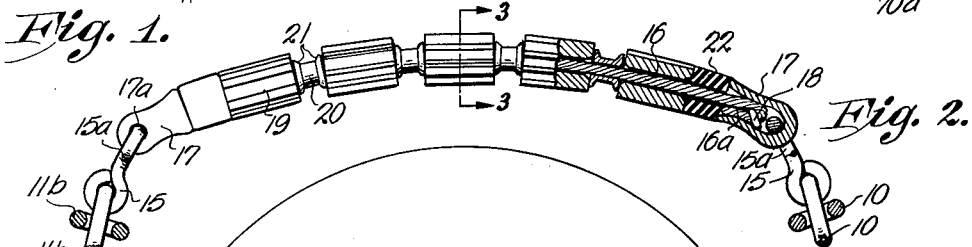
Fig. 2.
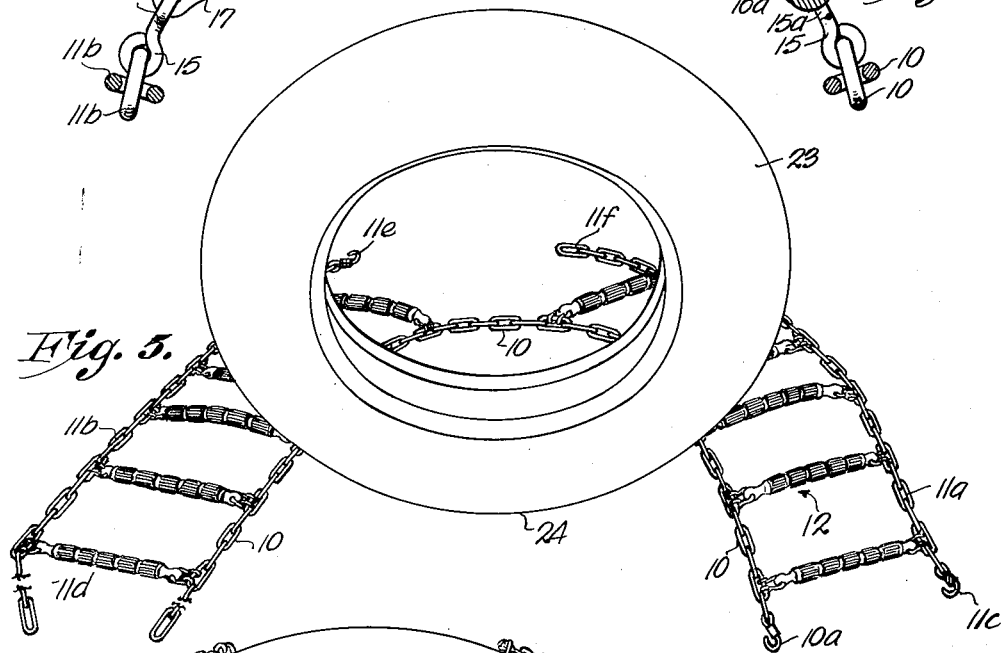
Fig. 5.
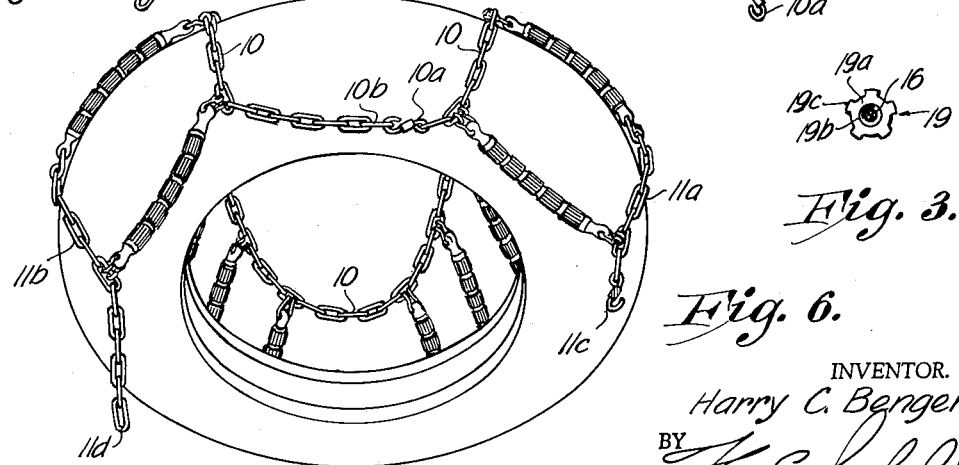
Fig. 3.
Fig. 6.
INVENTOR.
Harry C. Bengert
BY
ATTORNEY.

March 20, 1962  H. C. BENGERT  3,025,901
TIRE CHAIN

Filed May 25, 1960  2 Sheets-Sheet 2

INVENTOR.
Harry C. Bengert
BY
Thos E Scofield
ATTORNEY.

United States Patent Office
3,025,901
Patented Mar. 20, 1962

3,025,901
TIRE CHAIN
Harry C. Bengert, 3031 Roosevelt, Kansas City, Kans.
Filed May 25, 1960, Ser. No. 31,668
8 Claims. (Cl. 152—239)

This invention relates to improvements in tire chains which have one of the side chains thereof in two sections to speed and facilitate mounting of the chain on the tire and refers more particularly to such a tire chain with a simplified connection means to speed and ease central connection or disconnection of the two-section side chain and also with cross chains of such construction as to speed and facilitate mounting and dismounting of the chain on the tire.

Previously, tire chains have been provided in the art of a link construction comprising a pair of side chains with a plurality of cross chains connected to the side chains along the lengths thereof, and having one of the side chains constructed in two sections with a center fastener, whereby to permit mounting of the chain on the tire without requiring jacking up of the end of the car or moving the car onto the chain after the chain has been laid out. However, in chains of such construction, the multiplicity of end and center fasteners, together with their loose engaging ends, has made for difficulty and confusion in the process of mounting the chain on the tire. One common past difficulty has been that the character of the end and the center fasteners was identical, whereby they could not be distinguished, one from the other. Thus, it would be a great advantage to have a central fastener of markedly different character than the end fasteners, yet providing as secure engagement thereat as a conventional end fastener. The same is true of the end fasteners of the chain. It is absolutely necessary in a chain of this construction that the fasteners and loose ends be attached properly and in proper sequence to successfully apply the chain to the tire. Heretofore this lack of means of discrimination between fasteners and between ends has proved so complicating as to almost defeat the purpose of the two-section side chain construction.

A further difficulty with tire chains of the above-mentioned construction has been that, previously, no adequate provision has been made for providing a sufficient rigidity of connection between the side chains to enable the controlled slinging or swinging of the entire chain uniformly around the tire before connection begins. Sufficient cross chain rigidity has also not been provided to permit lateral translation of the chain across the tire. Additionally, such rigidity of connection has not been provided with cross connection means which not only give efficient traction to the chains on the tire, but also protect the tire against injury if such a cross chain breaks. The difficulty of manipulating a loose chain around and across a tire in the application and connection process is found in ordinary chains to some extent, but is aggravated in the present instance due to the presence of the extra center fastener and extra center loose end in the two-section side chain. This construction customarily has resulted in an unusually shapeless chain mass during the application process.

Therefore, an object of the present invention is to provide in a tire chain of a link construction formed of a pair of side chains connected along their length by a plurality of cross chains, at least one of the side chains having two sections, with a central fastener for detachably connecting the adjacent end of such sections, a unique type fastener for the central connection which is clearly and completely distinguishable from the end fasteners, yet which provides a swift, easy connection and disconnection with security of attachment and provision against unwanted release thereof.

Another object of the invention is to provide a tire chain of the above character with an improved fastener usable on one or more side chain ends and at a central side chain connection to aid and facilitate connection and aid in end and center connection identification or either alone.

Another object of the invention is to provide a tire chain of the above character with unique type cross chain construction which facilitates manipulation of the loose chain around the tire in the application and connection process.

Another object of the invention is to provide a tire chain of the above-mentioned character with markings on the end links and fasteners of both side chains, the markings on the end links and end fastener of each side chain similar to each other and different from the markings on the end links and end fastener of the other side chain.

Another object of the present invention is to provide such a marked tire chain wherein the markings comprise color patches on the end fasteners and opposing end links.

Other objects of the invention include provision of improved fastener and cross chain constructions particularly adapted but not restricted to chains of the character described.

Other and further objects of the present invention will appear in the course of the following description thereof.

In the accompanying drawings, which form a part of the instant specification and are to be read in conjunction therewith, there is shown an embodiment of the invention, and in the various figures, like numerals are employed to indicate like parts in the various views.

FIG. 1 is a plan view of a tire chain embodying the invention.

FIG. 2 is an end view of the chain of FIG. 1 showing a cross chain, parts in section and cut away to better illustrate the structure of the cross chain and its connection to the side chain.

FIG. 3 is a view taken along the line 3—3 of FIG. 2 in the direction of the arrows.

FIG. 5 is a view of a tire in perspective from the side and above in a first stage of positioning the inventive chain thereon.

FIG. 6 is a view similar to that of FIG. 5 showing a second stage in the application of the tire chain of FIG. 1 to an automobile tire.

Figure 4:
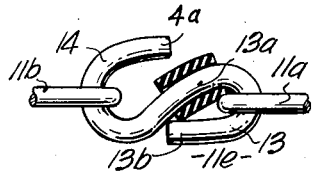
FIG. 4 is a side detail of the inventive fastener employed in the tire chain of FIG. 1.

Referring to the drawings, in FIG. 1 is shown a tire chain embodying the present invention having one single section side chain 10 connected with a double section side chain designated in one portion thereof by 11a and in the other portion thereof by 11b. A plurality of cross chains or members generally designated 12 and to be later described in detail connect the two side chains along the links thereof at spaced intervals. The side chains 10, 11a and 11b are of conventional metal link construction. The double section side chain 11a and 11b has end fastener 11c at one end thereof and end engaging links 11d at the other end thereof. Fastener 11c may be of either conventional construction, or of the form shown in FIG. 4.

Double-section side chain 11a and 11b also has center fastener 11e opposed by center engaging links 11f whereby the adjacent links of the two sections may be connected centrally. The particular preferred character of center fastener 11e and center engaging links 11f will be later described. Single section side chain 10 has end fastener 10a at one end thereof (preferably the same end as fastener 11c) and end engaging link 10b at the other end thereof. The fastener 10a may be conventional, or of the form of FIG. 4.

End fastener 10a and end links 10b of single-section side chain 10 are preferably marked for identification in a similar manner. Likewise, end fastener 11c and end links 11d of double-section side chains 11a and 11b are preferably marked for identification, the latter markings being distinguishable from the end markings of the side chain 10. This is true, independent of their structure. Preferably, the markings comprise color patches such as black and white paint. A modification of this marking may be achieved by constructing side chains 10 and 11a and 11b of different colored metal, one from the other. In this latter case, center fastener 11e and opposing links 11f should be marked with a third distinguishing color. Still another modification would involve stamping the fasteners and links with similar and different designs as indicated in the application of color or in forming them in different shapes.

Turning to FIG. 4, therein is shown an inventive form of fastener link usable at 10a, 11c and 11e, any two of these locations or any one. It will be described at the central position and has fastener link generally designated 11e adapted to engage the center links 11f. The structure of fastener 11e comprises an S-shaped metallic rod having a closed loop 13 fixedly yet pivotally engaging the end closed link of side chain 11a with the other end of the S opened in a loop generally designated 14. A sleeve of resilient material such as rubber or deformable plastic 15 is positioned over the central portion 13a of loop 13 with the free end portion 13b of loop 13 so closed against portion 13a as to prevent slipping of sleeve 15 onto open-ended loop 14. Link 11a prevents sleeve 15 from traveling from portion 13a of loop 13 to portion 13b. The opening or space between free end 14a of loop 14 and portion 13a of loop 13 is sufficient to permit the sliding thereout of the end link or another link 11f of the central end of side chain 11b. However, this opening must be slightly greater than this, namely, sufficient to permit the forcing of a link 11f through said opening by deformation and compression of sleeve 15. Thus, a link 11f cannot be freed from loop 14 or inserted thereon without overcoming some resistance and resilience in sleeve 15. The length of sleeve 15 preferably is that shown, extending from the substantial abutment of loop portion 13b with the portion 13a to the middle of loop 13 whereby to uniformly require compression and deformation of sleeve 15 to free or apply a link 11f on loop portion 14a. Link 11e must be of sufficient rigidity that it cannot be deformed within the limits of strength of chains 11a and 11b whereby to maintain loop 13 closed and loop 14 in its precise opened position.

If all fasteners are of this structure, speed is most facilitated but identity is not unless the fasteners are provided of or marked with different colors or other identification means. If one end fastener and the center one are this with the other end one conventional, identity is aided. The same is true with only the central fastener of the new form, but speed is not optimum.

In this type of fastener, identification may readily be facilitated by providing the rubber portions or sleeves 15 of different colors or forms or with identifying indicia.

Simple hook fasteners are about the oldest and the easiest to use, but they are troublesome in conventional use in that (1) they hook on to other parts of the chain when not desired, and (2) furthermore, they can easily shake unfastened when not desired if the chain becomes loose on the tire. By placing the piece of soft rubber or plastic tubing on the hook fastener of the character described, the gap of which is set and fixed at the proper gauge to necessitate forcing (squeezing) the engaging link between the hook end and the yielding rubber both in engaging and disengaging, tangling or catching of the hook fastener 11e onto other parts of the chain during handling or installation is completely avoided and, also, shaking loose thereof is completely prevented if the chain becomes loose on the tire. Speed and ease are also greatly facilitated.

Turning to FIG. 2, therein is shown the inventive construction of the cross member. At the left- and right-hand sides of this view are shown two consecutive engaging links of the one-piece side chain 10 and of the portion 11b of the two-piece side chain 11a and 11b. Fixed to one link 10 and one link 11b are traverse hook members 15 which each engage a side chain link with one loop thereof and has another like inner loop for engagement at right angles to the outer loop, the inner loop being designated in each case at 15a. A cross member 16 made up of a high tensile strength cable (multifiber) or small steel chain (not shown) communicates from opposed loops 15a between the side chains 10 and 11a or 11b. Cable 16 is connected to loops 15a by any conventional means, such as a sleeve 17 having an opening 17a at the outer end thereof, with the inner end thereof tightly formed or compressed on a loop 16a of cable 16. A ring 18 may be received in the cable loop 16a within the inward portion of sleeve 17 to aid in the connection between the cable and the sleeve. The inner portion of sleeve 17 rigidly fixes the end of the cable therein.

Slideably mounted on cable 16 between sleeves 17 are a plurality of rotatable, gear-like cleats generally designated 19. Referring to FIG. 3, it may be seen that each cleat comprises a cylindrical body 19a having a central opening 19b extending therethrough with a plurality of ridges or flanges 19c formed circumferentially spaced around said body 19a. The cleats are of case hardened metal, or the like to stand the pounding between the pavement and the tire. The fact that the cleats revolve distributes the wear over the different gripping edges. Spacers between successive cleats 19 on the cable or chain 16 comprise metal cylinders 20 having flared edge flanges 21 thereon or cylindrical rubber members 22 as shown between sleeves 17 and the outer cleats 19. Preferably the rubber spacers are employed at the periphery of the side chains where they take less beating and the metal spacers centrally thereof, but either metal or rubber may be used throughout the entire length of the center chains.

The previously-described structure of the cross members adds stiffness to each cross member, thus (1) making it possible to push each cross member up under the fender and over the top of the tire when required instead of having to lift it and (2) facilitating sweeping of the chain around the tire in such fashion as to maintain the side chain segments spaced from one another. Additionally, when any given cable finally wears out and breaks, the cleats and spacers readily can slide off at the broken ends, thereby not remaining to bang at the fender.

In FIGS. 5–9, inclusive, are shown successive stages in the process of applying and mounting the inventive tire chain on a rear automobile wheel. Only a tire 23 is shown standing vertically on any supporting surface 24 to aid in the illustration. Thus the hub cap, axle, tire spokes, fender, etc. are omitted for the purpose of illustration. However, the principle and stages of operation would be the same on an assembled automobile.

To install the inventive tire chain on the rear wheel of an automobile, the chain is laid out with the side chains parallel and with the two-section side chain facing away from the side of the car on which the particular chain is to be mounted. At this point, the center fastener 11e is detached. The operation will be described as if the single side chain section 10, fastener 10a and end links 10b were painted black and the double side chain end fastener 11c and end links 11d were painted white. By providing the fastener and end links first picked up of black color, identification in snow application and any application is greatly facilitated and these parts most easily located and recognized. Center fastener 11e and center links 11f would then be of plain metal color.

Describing the installation of the left tire chain on the left rear wheel of an automobile (assuming the tire 23 of FIG. 5 to be the left rear wheel of an automobile with the side facing the observer of the drawing the outside surface of the tire), the operator now takes hold of end fasteners 10a and 11c with his left and right hands, respectively, and, swinging the chain as if it were a whip, swings the other end of the chain having the black and white end links 10b and 11d, respectively, from right to left under the car and around to the inner side of tire 23 as shown in FIG. 5.

The operator then lifts black fastener 10a and black loose end 10b along the outside treadline of tire 23 and fastens fastener 10a to the last black link 10b (there to remain unless readjustment is needed later) as shown in FIG. 6. This first fastening leaves two open linkages on the chain, both on the double-section chain 11a and 11b.

Figure 7:
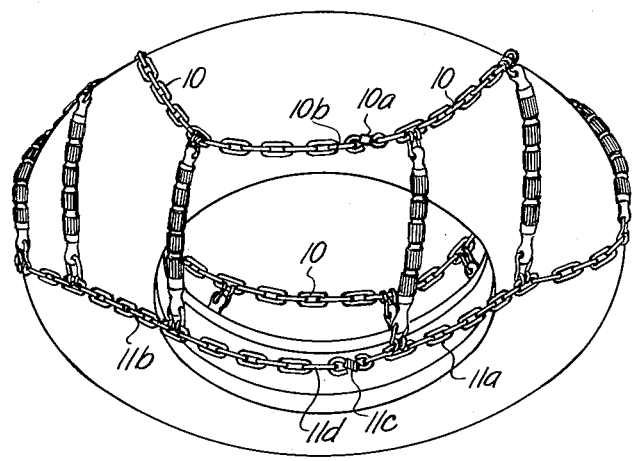
FIG. 7 is a view similar to those of FIGS. 5 and 6 showing a third stage of applying the chain to an automobile tire.

The next step, as shown in FIG. 7, comprises fastening white fastener 11c and white end link 11d at the last link. This second fastening operation leaves a single unconnected linkage, that of the central fastener 11e to links 11f in the double section side chain.

Figure 8:
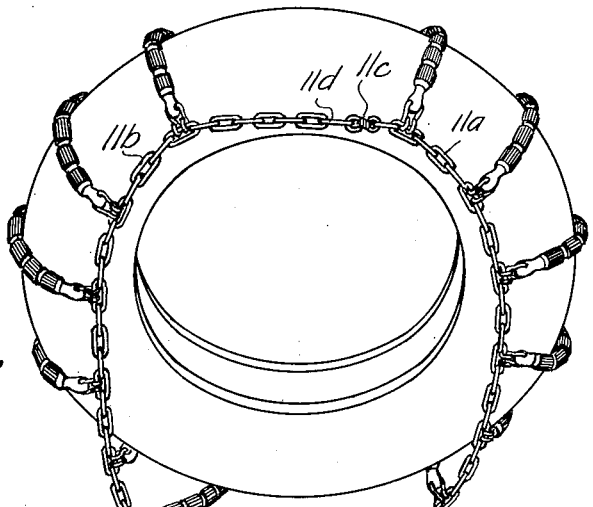
FIG. 8 is a view similar to FIGS. 5–7, inclusive, showing yet a further stage of applying the chain to an automobile tire.

The operator then lifts the connected black fastener 10a and black link 10b to the top of the tire and allows them to fall into their final position on the inner side of the tire, while bringing white fastener 11c and white link 11d into the proper position as shown in FIG. 8. It should be noted, however, that this operation is greatly facilitated by the stiffness of the cross member employing cleats 19 whereby the operator may grasp the cross members on each side of white links 11c and 11d close to or at sections 11a and 11b and lift the two cross members over the tire and under the fender without touching the side chain 10 or links 10a and 10b. Thus, the operator maintains his hands on the outer surface of the tire at all times while achieving the positioning of chain 10 on the back side of the tire. This is a major advancement and improvement achievable only by the substantially rigid yet yieldable and resilient cross member construction provided by this invention. Thus, additionally, there is little, if any, need to reach around behind the tire to pull the side chain 10 into position.

Figure 9:
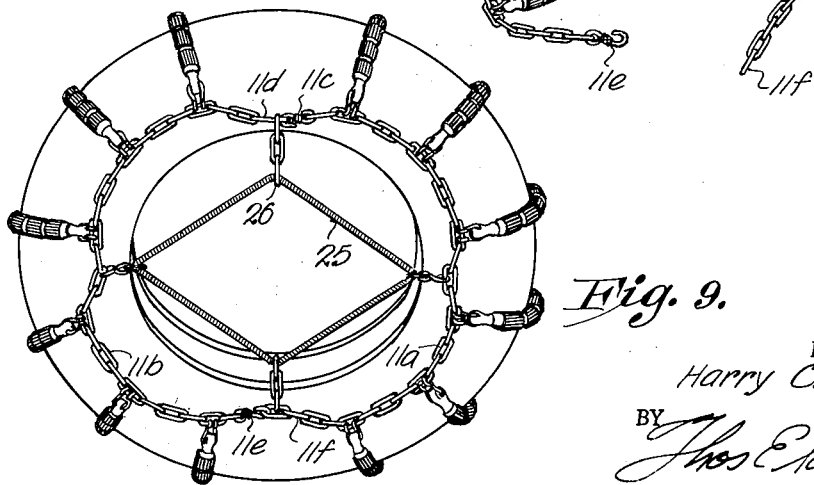
FIG. 9 is a view similar to FIGS. 5–8, inclusive, showing the chain fully applied to an automobile tire.

The operator fastens the plain fastener 11e of FIG. 4 to the plain end link 11f at the bottom of the tire in FIG. 8 after the prior described adjustment whereby to complete the enclosure of the tire by the tire chain. If there are extra links to be taken up by the plain fastener, a readjustment of the white fastener and white links 11c and 11d may be easily made on the outside upper surface of the tire so as to have the same number of unused white links as unused plain links extending as excess from the fasteners. This adjustment gives perfect and complete balance of the tire chain on the tire and unused links may be tied back in conventional manner or connected diametrically across the hub as shown in FIG. 9, utilizing conventional holding means 25 having conventional clips 26 to engage the various links. The latter means (a chain tightener) is rarely needed, if ever, if the cross member construction of FIG. 3 is employed with at least some of the spacers thereof resilient. This construction is such that the cross members tend to straighten out over the tire thus tending to keep the chain taut from the final engagement.

The entire operation, as described, can be performed on cars with low cut fenders in less than a minute, without the operator having to once reach around to the inner side of the tire and, additionally, without the necessity of jacking up the rear end of the car or moving the car. If the chains are installed while the tires are struck in snow or mud, the operator may check for looseness or slack after the car has been driven a few feet clear, and a tighter takeup, if necessary, can be made at the white and plain fasteners.

To remove the chains, the operator may proceed in the conventional manner by unfastening the white and black fasteners, thereby causing the chain to fall from the tire. This conventional process, however, necessitates reaching behind the tire. Therefore, it is preferable to remove the chain in the precise reverse operation as previously described.

In the preferred method of removing the inventive tire chain from the automobile tire, the operator stops the tire with the plain fastener at the bottom as shown in FIG. 9, unfastens plain fastener 11e from end links 11f, pulls white fastener 11c toward him and down until the black fastener 10a appears as in FIG. 7, then unfastens both the black and white fasteners and then pulls the loose chains entirely away from the car.

It should be noted that when the side chains are marked by constructing them of different colored metals, to be able to identify the center fastener 11e and center links 11f, it is necessary to apply a third color thereto. If such is not done, the operator will be unable to ascertain which of the two fasteners on the face of the tire is the center fastener on the double-section chain 11a and 11b without looking behind the tire. Therefore, to be able to conveniently apply the preferred tire removal procedure, it is necessary to have the three fasteners 11a, 11c and 11e each of a different color.

From the foregoing it will be seen that this invention is one well adapted to attain all of the ends and objects hereinabove set forth together with other advantages which are obvious and which are inherent to the structure.

It will be understood that certain features and subcombinations are of utility and may be employed without reference to other features and subcombinations. This is contemplated by and is within the scope of the claims.

As many possible embodiments may be made of the invention without departing from the scope thereof, it is to be understood that all matter herein set forth or shown in the accompanying drawings is to be interpreted as illustrative and not in a limiting sense.

Having thus described my invention, I claim:

1. In a tire chain comprising a pair of flexible side chains of a link construction, each side chain having a fastener at one end thereof to engage the links at the other end thereof, a plurality of cross members connected at their ends to the side chains along the length thereof, one of said side chains being in two sections and having a central fastener for detachably connecting the adjacent ends of said sections, the improvement which comprises a plurality of said cross members of limited flexibility, each said cross member comprising a resilient cable means connected at each end thereof to a side chain and having a plurality of rigid cleats rotatably mounted thereon, each said cleat having a cylindrical body portion with a plurality of rigid flanges on the outer surface thereof and extending substantially radially thereof and substantially parallel to the longitudinal axis of said cleat body portion, said flanges of limited and substantially uniform radial thickness whereby to permit the cleats to rotate on the cable mounting same when emplaced on the tire, a spacer positioned between each adjacent cleat of lesser outer diameter than the outer diameter of the cleat flanges and a spacer positioned between the outermost cleat and the side chain connections of said cable means, said cross members of sufficient stiffness to be self-supporting when grasped at one end thereof.

2. A tire chain as in claim 1 wherein said spacers are resilient between the outermost cleat and the side chain connections of the cable means and rigid between said cleats.

3. A tire chain as in claim 1 wherein at least one side chain carries a hook fastener adapted to be engaged and disengaged from a link of said side chain, said fastener comprising a metal rod formed to an S-shape, one leg of the S enclosing a link of said side chain to complete a substantial O figure and one-half of the S whereby to prevent disengagement of the hook fastener with the said link, the other end of the rod formed to a substantial C shape whereby the free end thereof approaches the body of the rod, but is spaced therefrom a sufficient distance to engage a link of said side chain therewith, and a resilient sleeve engaging a portion of the O leg opposite the approach of the C leg free end to the rod, said resilient sleeve so formed and the free end of said C portion so spaced from the rod that force is required to engage and disengage a link from said side chain with said C portion of said hook.

4. A tire chain as in claim 1 including a fastener on one end of each side chain, each side chain and fastener thereon of a different color metal throughout its length and the other side chain, and the center fastener and opposing links thereof of the two-section side chain having different markings to distinguish them from the end links and end fasteners of the said side chains.

5. A tire chain as in claim 3 including distinguishing markings on the end links and end fasteners of both side chains, the markings on the end links and end fasteners of each side chain similar to each other and different from the markings on the end links and end fasteners of the other side chain, the central fastener of the two-section side chain of the S type and different from the fasteners at the ends of the side chains.

6. A hook fastener for a tire chain having a pair of flexible side chains of a link construction, said fastener adapted to be engaged and disengaged from a link of one of said side chains, comprising a metal rod formed to a S shape, one leg of the S enclosing a link of one of said side chains to complete a substantial O figure and one-half of the S whereby to prevent disengagement of the hook fastener with said link, the other end of the rod formed to a substantial C shape whereby the free end thereof approaches the body of the rod, but is spaced therefrom a sufficient distance to engage a link of one of said side chains therewith, and a resilient sleeve engaging a portion of the O leg opposite the approach of the C leg free end to the rod, said resilient sleeve so formed and the free end of said C portion so spaced from the rod that force is required to engage and disengage a link from one of said side chains with the said C portion of said hook, said resilient sleeve extending from the free end of said O portion approach to the rod substantially into the curvature of the O portion.

7. As a subcombination, a cross member connection for a tire chain having a pair of flexible side chains of a link construction, said cross member connected at its ends to the side chains, comprising, in combination, a resilient cable means connected at each end thereof to a side chain and having a plurality of rigid cleats rotatably mounted thereon, each said cleat having a cylindrical body portion with a plurality of rigid flanges on the outer surface thereof and extending substantially radially thereof and substantially parallel to the longitudinal axis of said cleat body portion, said flanges of limited and substantially uniform radial thickness whereby to permit the cleats to rotate on the cable mounting the same when applied to the tire, a spacer positioned between each adjacent cleat of lesser outer diameter than the outer diameter of the cleat and a spacer positioned between the outermost cleat and side chain connections of said cable means, said cross member of sufficient stiffness to be self-supporting when grasped at one end thereof.

8. A cross member as in claim 7 wherein the outermost spacers are resilient and the inner spacers are rigid.

References Cited in the file of this patent
UNITED STATES PATENTS

| | | |
|---|---|---|
| 1,340,183 | Parker | May 18, 1920 |
| 2,332,113 | Reed | Oct. 19, 1943 |
| 2,424,478 | Mason | July 22, 1947 |
| 2,547,007 | Horner et al. | Apr. 3, 1951 |
| 2,589,207 | Welsh | Mar. 11, 1952 |
| 2,660,679 | Hunt | Nov. 24, 1953 |
| 2,700,405 | St. Pierre | Jan. 25, 1955 |
| 2,740,449 | Erving | Apr. 3, 1956 |
| 2,806,504 | Thomas | Sept. 17, 1957 |